United States Patent
Wang et al.

(10) Patent No.: US 12,375,613 B2
(45) Date of Patent: Jul. 29, 2025

(54) METHOD AND ARRANGEMENTS RELATING TO GROUP TRANSMISSION IN A WIRELESS COMMUNICATION NETWORK

(71) Applicant: Telefonaktiebolaget LM Ericsson (publ), Stockholm (SE)

(72) Inventors: Min Wang, Luleå (SE); Jan Christoffersson, Luleå (SE); Mårten Ericson, Gammelstad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 366 days.

(21) Appl. No.: 17/919,359

(22) PCT Filed: Apr. 20, 2020

(86) PCT No.: PCT/SE2020/050401
§ 371 (c)(1),
(2) Date: Oct. 17, 2022

(87) PCT Pub. No.: WO2021/215973
PCT Pub. Date: Oct. 28, 2021

(65) Prior Publication Data
US 2023/0114449 A1    Apr. 13, 2023

(51) Int. Cl.
*H04M 15/00* (2024.01)
*H04W 4/24* (2018.01)

(52) U.S. Cl.
CPC ....... *H04M 15/8072* (2013.01); *H04M 15/66* (2013.01); *H04M 15/8083* (2013.01); *H04M 15/8214* (2013.01); *H04W 4/24* (2013.01)

(58) Field of Classification Search
CPC ............. H04M 15/8072; H04M 15/66; H04M 15/8083; H04M 15/8214; H04M 15/765;
(Continued)

(56) References Cited

U.S. PATENT DOCUMENTS

| | | | | |
|---|---|---|---|---|
| 10,321,462 B2* | 6/2019 | Lim | ...................... | H04W 72/51 |
| 2012/0109800 A1* | 5/2012 | Zhou | ................. | H04M 15/7652 |
| | | | | 705/34 |

(Continued)

FOREIGN PATENT DOCUMENTS

| | | |
|---|---|---|
| CN | 103974219 B | 8/2019 |
| EP | 3122111 A1 | 1/2017 |

(Continued)

OTHER PUBLICATIONS

International Search Report and Written Opinion of the International Searching Authority, PCT/SE2020/050401, mailed Feb. 24, 2021, 11 pages.

(Continued)

*Primary Examiner* — Christopher M Brandt
(74) *Attorney, Agent, or Firm* — Weisberg I.P. Law, P.A.

(57) ABSTRACT

Method and device(s) for supporting charging relating to a group transmission in a wireless communication network, said group transmission involving a group of wireless devices configured to, via one or more direct communication links between each other, participate in data transmission between a source wireless device and the wireless communication network. Data is transmitted on a device specific group bearer in a core network of the wireless communication network, which second data relates to the group transmission and to a wireless device of the group. Said device specific group bearer being configured specifically for data transmission usage relating to the wireless device when the data transmission is part of the group transmission.

17 Claims, 7 Drawing Sheets

(58) Field of Classification Search
CPC ....... H04W 4/24; H04W 76/11; H04W 76/14; H04W 88/04; H04W 40/22; H04L 12/1407
See application file for complete search history.

(56) References Cited

U.S. PATENT DOCUMENTS

| | | | |
|---|---|---|---|
| 2013/0316681 | A1 | 11/2013 | Huang et al. |
| 2016/0261757 | A1 | 9/2016 | Rajadurai et al. |
| 2017/0264444 | A1* | 9/2017 | Li .................. H04L 12/1403 |

FOREIGN PATENT DOCUMENTS

| | | |
|---|---|---|
| WO | WO 2011/060673 A1 | 5/2011 |
| WO | WO 2014/059599 A1 | 4/2014 |
| WO | WO 2015/065079 A1 | 5/2015 |
| WO | WO 2017/030520 A1 | 2/2017 |
| WO | WO 2017/182068 A1 | 10/2017 |

OTHER PUBLICATIONS

Elmenreich, W., et al., "Building Blocks of Cooperative Relaying in Wireless Systems," Springer E&I Journal, 125(10), Aug. 14, 2008, 9 pages.
Jung, S., et al., "A new way of extending network coverage: Relay-assisted D2D communications in 3GPP," ScienceDirect, ICT Express 2 (2016) Aug. 20, 2016, 5 pages.
EPO Communication with Supplementary European Search Report dated May 12, 2023 for Patent Application No. 20932344.3, consisting of 4-pages.
EPO Communication dated May 24, 2023 for Patent Application No. 20932344.3, consisting of 9-pages.

* cited by examiner

METHOD AND ARRANGEMENTS RELATING TO GROUP TRANSMISSION IN A WIRELESS COMMUNICATION NETWORK

CROSS REFERENCE TO RELATED APPLICATIONS

This application is a 35 U.S.C. § 371 national stage application of PCT International Application No. PCT/SE2020/050401 filed on Apr. 20, 2020, the disclosure and content of which is incorporated by reference herein in its entirety.

TECHNICAL FIELD

Embodiments herein concern a method and arrangements for supporting charging relating to a group transmission in a wireless communication network, said group transmission involving a group of wireless devices configured to, via one or more direct communication links between each other, participate in transmission of user data between a source wireless device and the wireless communication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "Node B", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may generally be used for the transmission path from the wireless communication network, e.g. base station thereof, to the wireless device. The expression uplink (UL) may be used for the transmission path in the opposite direction i.e. from the wireless device to the wireless communication network, e.g. base station thereof.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

The next generation wide area and high frequency networks may be referred to as Next generation (NX), New Radio (NR), or fifth generation (5G).

Device to Device (D2D) communication, i.e. wireless devices also communicating directly with each other without doing it via the network, has been around for some time and be utilized in various ways. For example, 3GPP has specified Proximity Services (ProSe) as a D2D technology that allows wireless devices to detect each other and to communicate directly via a so called Side Link (SL), i.e. a wireless air interface for direct connectivity between devices.

Further, D2D cooperative group communication has been discussed as a way to increase the uplink coverage and user bit rate for example in 5G networks. The basic idea is also known as cooperative relaying or Virtual Antenna Array, se e.g. "Building Blocks of Cooperative Relaying in Wireless Systems", W. Elmenreich et. Al, University of Klagenfurt, Springer Journal 125, pages 353-359, 2008.

In group transmissions it is utilized direct, i.e. D2D, communication between devices over SLs. The basic idea with group transmission is that a UE wanting to transmit data, which UE therefore may be named a source UE, instead of transmitting the data itself directly to the network, e.g. directly to a base station, utilizes one or more other UEs and transmits at least part of the data over SL(s) to these UEs, and then they transmit it further to the network, e.g. to the base station. This means that a UE can be enabled to transmit data to the network even without own network coverage and/or that the data can be transmitted with higher bandwidth, better coverage, etc. to the network than else would be possible. This may be of particular interests for UEs that correspond to M2M devices, e.g. sensors in areas with no or poor direct network coverage.

As realized, group transmission of this kind will introduce new situations and challenges that have to be handled. Some conventional solutions may no longer work, at least not without adaptation.

SUMMARY

In view of the above, an object is to provide one or more improvements or alternative in relation to the prior art, such as to support and facilitate employment of group transmission, e.g. of the kind indicated in the Background, in a wireless communication network.

According to a first aspect of embodiments herein, the objective is achieved by a first method, performed by one or more first devices, for supporting charging relating to a group transmission in a wireless communication network. The group transmission involving a group of wireless devices configured to, via one or more direct communication links between each other, participate in transmission of first data between a source wireless device and the wireless communication network. The first device(s) initiates to transmit, to a network node of the wireless communication network, second data on a device specific group bearer in a core network of the wireless communication network. The second data relates to the group transmission and to a wireless device of the group. Said device specific group bearer being configured specifically for data transmission usage relating to the wireless device when the data transmission is part of the group transmission.

According to a second aspect of embodiments herein, the objective is achieved by a second method, performed by one or more second devices, for supporting charging relating to a group transmission in a wireless communication network. The group transmission involving a group of wireless devices configured to, via one or more direct communication links between each other, participate in transmission of first data between a source wireless device and the wireless communication network. The second device(s) initiates to receive, by a network node of the wireless communication network, second data transmitted on a device specific group bearer in a core network of the wireless communication network. The second data relates to the group transmission and to a wireless device of the group. Said device specific group bearer being configured specifically for data transmission usage relating to the wireless device when the data transmission is part of the group transmission.

According to a third aspect of embodiments herein, the objective is achieved by one or more first devices for supporting charging relating to a group transmission in a wireless communication network. The group transmission involving a group of wireless devices configured to, via one or more direct communication links between each other, participate in transmission of first data between a source wireless device and the wireless communication network. The first device(s) is configured to initiate to transmit, to a network node of the wireless communication network, second data on a device specific group bearer in a core network of the wireless communication network. The second data relates to the group transmission and to a wireless device of the group. Said device specific group bearer being configured specifically for data transmission usage relating to the wireless device when the data transmission is part of the group transmission.

According to a fourth aspect of embodiments herein, the objective is achieved by one or more second devices for supporting charging relating to a group transmission in a wireless communication network. The group transmission involving a group of wireless devices configured to, via one or more direct communication links between each other, participate in transmission of first data between a source wireless device and the wireless communication network. The second device(s) is configured to initiate to receive, by a network node of the wireless communication network, second data transmitted on a device specific group bearer in a core network of the wireless communication network. The second data relates to the group transmission and to a wireless device of the group. Said device specific group bearer being configured specifically for data transmission usage relating to the wireless device when the data transmission is part of the group transmission.

The above described device specific group bearer in the core network enable information and data transmission to the core network that can be separated from conventional device specific transmissions and identify them as relating to group transmission and at the same time also to certain users, i.e. to specific wireless devices of the group. Nodes(s) in the core network that handle charging is thereby enabled to apply different charging policies for group transmissions and for specific wireless devices participating in the group transmission. It can be made sure that e.g. the source wireless device can be charged separately for group transmission, e.g. at a certain rate, while at the same time assisting wireless devices of the group can be rewarded for assisting the source wireless device.

Thanks to the possibility to separate out individual devices involved in group transmission and group transmission from conventional transmission, fair and motivated charging can be applied. Users can thereby be more motivated to accept or let their wireless devices be used to assist in group transmission, which is needed in practice to make group transmission be successful or even useful. This in turn should make operators more willing to employ group transmission in their wireless networks.

Hence, embodiments herein support and facilitate employment of group transmission in wireless communication networks.

BRIEF DESCRIPTION OF THE DRAWINGS

Examples of embodiments herein are described in more detail with reference to the appended schematic drawings, which are briefly described in the following.

DETAILED DESCRIPTION

Figure 1:
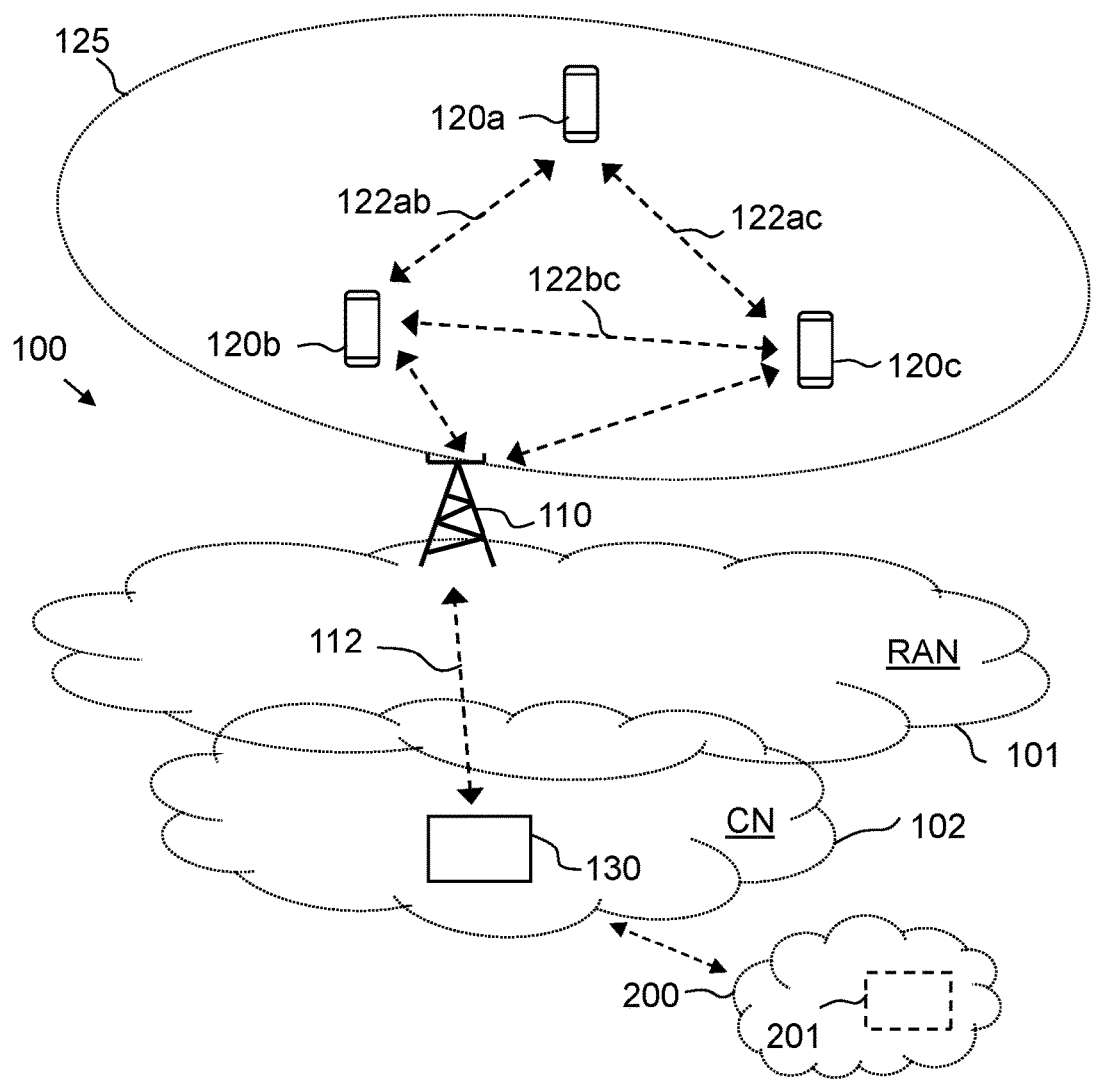
FIG. 1 is a block diagram schematically depicting a wireless communication network to be used for discussing embodiments herein.

Throughout the following description similar reference numerals may be used to denote similar elements, units, modules, circuits, nodes, parts, items or features, when applicable.

In the following, embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

FIG. 1 is a block diagram schematically depicting a wireless communication network 100 to be used for discussing and exemplifying embodiments herein, and in which embodiments herein may be implemented.

The wireless communication network 100 may comprise a Radio Access Network (RAN) 101 part and a Core Network (CN) 102 part. The wireless communication network 100 may be a telecommunication network or system, such as a cellular communication network that supports at least one Radio Access Technology (RAT), e.g. LTE, or 4G, and/or New Radio (NR) that also may be referred to as 5G, or even further generations.

The wireless communication network 100 typically comprises network nodes that are communicatively interconnected. The network nodes may be logical and/or physical and are located in one or more physical devices. The wireless communication network 100, typically the RAN 101, comprises one or more radio network nodes, e.g. radio network nodes 110. The radio network nodes are or comprise radio transmitting network nodes, such as base stations and/or are or comprises controlling nodes that control one or more radio transmitting network nodes. The radio network nodes are configured to serve and/or control and/or manage one or more wireless communication devices. Each radio network node provide one or more radio coverages, e.g. corresponding to one or more radio coverage areas, i.e. radio coverage that enables communication with one or more wireless communication devices. A wireless communication device may alternatively be named a wireless device and it may correspond to a UE etc. as mentioned in the Background. Each radio coverage may be provided by and/or associated with a particular Radio Access Technology (RAT). Each radio coverage area may correspond to a so called cell or a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few communication devices at the same time, and may be specifically set up for serving this one or few communication devices. The beam may be changed dynamically by beamforming to provide desirable coverage for the one or more wireless communication devices being served by the beam. There may be more than one beam provided by one and the same radio network node.

Said radio network nodes may e.g. be communicatively connected, such as configured to communicate, over, or via, a certain communication interface and/or communication link.

Further, the wireless communication network 100, or rather the CN 102, comprises one or more core network nodes 130, that may be communicatively connected to each other and other network nodes, such as configured to communicate, over, or via, a communication interface and/or communication link, with radio network nodes of the RAN 201, e.g. with the radio network node 110.

There are typically one or more bearers set up between nodes in the wireless communication network 100 for carrying data of data transmission. The bearers are set up over different communication interfaces that typically are predetermined and depends on the type of nodes the interfaces are between. For example, there may be one or more bearers 112 between the radio network node 110 and one of the core network nodes 112. Since these are in the core network they may be referred to as core network bearers. In case of a 3GPP 5G network such bearer may be set up of over an N3 interface between a gNB node and an User Plane Function (UPF) node, and/or in an 3GPP LTE, i.e. 4G, network such bearer may be set up of over an S1 interface between an eNB and a Serving GateWay (SGW) node. Further, although not shown in the figure, there are typically other and different communication interfaces between core network nodes and bearers set up also over these interfaces when information and data shall be transmitted. The figure also shows wireless communication devices 120a-c for communication with the wireless communication network 100, e.g. by being served by the radio network node 110 when within radio coverage associated with it. In the shown view the wireless device 120a is located farthest away from the radio network node 110 and may have nor or poor direct communication capability with the wireless communication network 100, at least compared to the wireless communication devices 120b-c. This is indicated in the figure by the arrows between the wireless devices 120b-c and the radio network node 110. Further, the wireless devices 120a-c are capable of communication directly with each other over respective side links, SLs, as indicated in the figure by the arrows between the wireless devices 120a-c, i.e. side links 122ab, 122ac, 122bc. Further, the wireless devices 120a-c may correspond to a group 125 for group transmission, as will be further discussed separately below.

The figure also shows a further node 201 and a further network 200. The further node 201 may be located outside the wireless communication network 100, i.e. be an external node, as indicated in the figure, or alternatively (not indicated in the figure) be comprised in the wireless communication network 100 and thus be a network node thereof, e.g. a management node thereof. The further network node 201 may in principle be any node communicatively connected to the wireless communication network 100. Likewise, the further network 200 may be located outside the wireless communication network 100, i.e. be an external network, as indicated in the figure, e.g. corresponding to a so-called computer cloud, often simply referred to as cloud, that may provide and/or implement services and/or functions for and/or relating to the wireless communication network 100. The further network 200 may alternatively (not indicated in the figure) be comprised in the wireless communication network 100 and thus e.g. correspond to a subnetwork thereof. It is implied that a network 100 and the further network 200 comprises interconnected network nodes and may e.g. include the further node 201 as indicated in the figure. The further network 200 may in principle be any network communicatively connected to the wireless communication network.

Attention is drawn to that FIG. 1 is only schematic and for exemplifying purpose and that not everything shown in the figure may be required for all embodiments herein, as should be evident to the skilled person. Also, a wireless communication network or networks that correspond(s) to the wireless communication network 100, will typically comprise several further network nodes, such as further radio network nodes, e.g. base stations, network nodes, e.g. both radio and core network nodes, etc., as realized by the skilled person, but which are not shown herein for the sake of simplifying.

As a development towards embodiments herein, the situation indicated in the Background will first be further elaborated upon.

For better understanding of group transmission of the kind described in the Background and how such can be implemented, an example implementation will be described in some detail.

On a high level, consider a group of UEs, e.g. the wireless communication devices 120a-c, such as UEs in the form of sensor devices, that are D2D capable, i.e. able to communication with each other over sidelinks, i.e. SLs. The wireless communication devices 120a-c may correspond to the group 125 for group transmission. When a UE of the group has data to transmit, e.g. the wireless communication device 120a, it may first distribute the data to neighbouring UE(s) in the group over D2D link(s), i.e. the SLs. For example, wireless device 120a may send the data over SLs 122ab, 122ac to the wireless devices 120b-c. This first step may be referred to as a first hop. In a second step or hop, the UEs in the group may then cooperatively, or at least some UEs of the group able to do so, transmit the data to the wireless communication network 100, e.g. the wireless communication devices 120b-c may transmit respective parts of the data received from the wireless device 120a over the SLs, to the radio network node 110. This example was in the UL, in the DL, the network 100 may transmit data to the group as if it was a single UE. At least one UE in the group must be able to receive the DL data. If necessary, the DL data may then be relayed to the other UEs in the group via SLs. In case only a single UE of the group is meant to be recipient, the data may reach this UE via such relaying.

Group transmission like this may e.g. increase the UL coverage by combining transmissions from several UEs and may also be beneficial from a latency point of view compared to e.g. repeated transmissions that may be needed in case of bad radio coverage.

An identified first problem, or challenge, with group transmissions is how to perform charging, i.e. the ability to be able to, typically based on data and/or network usage, charge individual wireless devices, say the source wireless device, e.g. the wireless device 120a, for the amount of data it has used in the DL and/or UL. Or perhaps more relevant, how to keep track of the amount of data transmitted per wireless device. It is also desirable to be able to separate data that is transmitted as part of group transmission from data sent conventionally.

Charging as used herein is concept well recognized in the context of wireless communication networks, in particular of the type discussed herein, e.g. 5G, 4G/LTE, 3G and similar, where charging functionality is known to be present in the core network. More generally, as used herein, charging in relation to a wireless device may be described as keeping track of, e.g. by measuring and/or estimating, such as according to some predetermined or predefined relation or function, a cost and/or liability for payment associated with the wireless device or user thereof.

However, in case of the above group transmission example, the network may have no direct connection with a source wireless device when its data is delivered by e.g. wireless communication devices 120b and/or 120c. A wireless device part of a group may transmit data outside the group, e.g. conventional UL transmission or as part of the group, i.e. group transmission. In both cases, the bearers used by the CN are typically the own bearers of the wireless device. However, the charging policies are desirable to differ for a group transmission compared to a conventional transmission, where e.g. an operator may want to charge more or less for a group transmission, e.g. due to using less resources over radio, compared to a conventional transmission. Furthermore, for a group transmission in which a wireless device is participating, a high portion of the data carried on a group radio bearer, e.g. data addressed to a group Radio Network Temporary Identifier (RNTI) or group Cell RNTI (C-RNTI), on the combined radio link is not from the wireless device itself, but from other assisting wireless devices of the group. Applying the same charge rate for this data volume as for the data generated by the source wireless device itself would make no sense. So, in case an assisting wireless device is performing in group transmission on behalf of a another wireless device, e.g. data on behalf of the source wireless device, the assisting wireless device should not be charged. It is only the source wireless device that should be charged since it is only the source wireless device that benefits from the transmission. It would not be desirable if assisting wireless devices were associated with and charged for data transmitted on behalf of wireless communication device 120a, it would rather be desirable or even required for practical success if they instead could be rewarded in some sense.

Another, second problem is for cases when there is a wireless device of the group that is not registered and thus does not have any own CN bearer configured. In group transmission it may then be utilized group bearers that belongs to the group as such, e.g. all the way to a Data Network (DN) node and then e.g. to the Internet. This may work fine in the sense that the data transmission for the source wireless device can be accomplished but it typically makes it impossible for an operator to charge the specific wireless device that uses the group bearers and/or keep track of the amount of data per wireless device.

A third identified problem is how to make users willing to participate in a group transmission, especially for users that do not utilize the group transmission at all or not very much for themselves, but that still are very useful for other wireless devices acting as source wireless devices. Transmitting on behalf of another wireless device drain battery which is a serious drawback and makes the whole concept of group transmissions questionable in some scenarios. Without possibility to suitably separate group transmission charging from normal transmission charging, it will be difficult to motivate, e.g. through compensation or payback, assisting wireless devices to participate and there is a risk that too few chose to participate in group transmissions for these to be successful.

In the existing ProSE technology mentioned in the Background, in particular the Prose Layer 3 relaying function, see e.g. A new way of extending network coverage: Relay-assisted D2D communications in 3GPP, SungHoon Junga, Junsu Kimb, ICT Express 2 (2016), pages 117-121, a relay wireless device reports the context of a remote wireless device, such as an Evolved Packet switched System (EPS) bearer identity or identifier (ID) used for relaying, remote UE ID, e.g. International Mobile Subscriber Identity (IMSI) or Mobile Station International Subscriber Directory Number (MSISDN), and optionally, the IP address to a CN entity so that the CN entity can perform charge for the remote wireless device based on its transmitted data volume. Since the Prose Layer 3 relaying was originally designed for extension of coverage for MTC devices, meaning that both remote devices and relay devices are owned by the same owner, the charging method associated with it has several drawbacks and is not suitable for group transmissions as described above. Observed problems include:

1) In the existing Prose Layer 3 relaying, a relay wireless device serves one remote wireless device and it does not support a group transmission mode as above and the charging method does not work for such.
2) There is no payback mechanism for relaying wireless devices.

Figure 2:
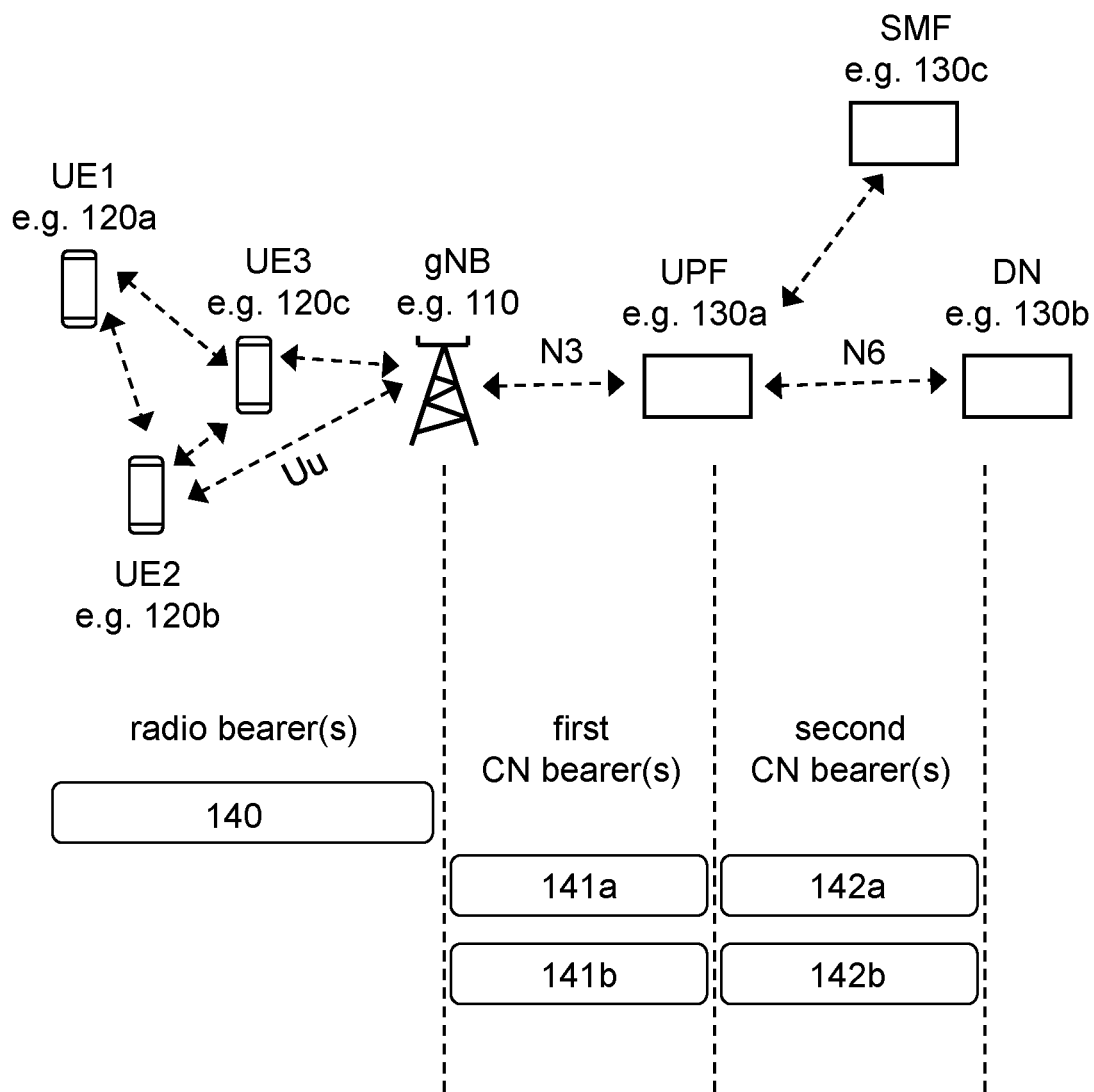
FIG. 2 is a block diagram schematically depicting a wireless communication network to be used for discussing and exemplifying embodiments in a 3GPP 5G context.

FIG. 2 is a block diagram schematically depicting a wireless communication network to be used for discussing and exemplifying embodiments herein in a 3GPP 5G context. It is recognized that nodes shown may correspond to nodes of the wireless communication network 100 of FIG. 1. For example, there is a UE1 that may correspond to the wireless device 120a, a UE2 that may correspond to the wireless device 120b, an UE2 that may correspond to the wireless device 120b, a gNB that may correspond to the radio network node 11. There is also shown an UPF node, Session Management Function (SMF) node and a DN node, which may be comprised in the core network node(s) 130, e.g. correspond to core network nodes 130a-c, respectively, as indicated in the figure. At the lower part is shown bearers that may be setup for use between different nodes. There is shown: radio bearer(s) 140, in 5G over the so called Uu interface between UE(s) and the gNB, first core network bearers 141a,b, in 5G over the so called N3 interface between the gNB and UPF node, and second core network bearers 142a,b, in 5G over the so called N6 interface, between the UPF node and the DN node. the first core network bearer 141a and the second core network bearer 142a may be device specific and the first core network barer 141b and the second core network bearer 142b may be group bearers. The core network bearers, or CN bearers 141a,b and 142a,b will be used as examples below when explaining different embodiments.

Note that in reality there are of course many more bearers, typically corresponding to PDU sessions per UE, due to different type of services going on.

An idea underlying embodiments herein, and for solving e.g. the first problem mentioned above, is to create a parallel set of bearers and context in the CN for each wireless device that participate in a group transmission. That is, use device specific group bearers, or in other words, device specific bearers but that are assigned for group transmission. This means that a conventional CN bearer for say a UE and the "new" device specific group bearer for this UE can have different charging policies. The core network node(s) involve in charging, which may be referred to as Policy and Charging Control (PCC) node(s), and e.g. may correspond to SMF and/or Policy and Rate Function (PCRF) node(s), can thereby identify how the source UE's data was transmitted. In 3GPP 5G and its corresponding core network 5GC, the PCC is expected to reside in the SMF and may be referred to as Policy Control Function (PCF). The charging parameters for the device specific group bearer can be the same as for a normal CN bearer, e.g. data volume, bit-rate, Quality of Service (QOS) etc. See e.g. 3GPP TS 32.255, "Telecommunication management; Charging management; 5G data connectivity domain charging; Stage 2", V16.3.0, section 5.3.1. In addition, it can also be used parameters related to the group, such as the number of other UEs in the group etc. With reference to FIG. 2, if the first CN bearer 141a is a conventional one for a UE, the second UE bearer 141b may be a another "parallel" CN bearer for this UE and that is specific for group transmissions, i.e. a device specific group bearer for this UE. Corresponding CN bearers may be set up also over other CN interfaces, such as illustrated by the second CN bearers 142a,b over N6 in FIG. 2.

However, the above solution idea may not be suitable in all situations. Another idea behind embodiments herein and for solving said first problem is therefore to use a special or certain first identifier when group transmission data is sent on a UEs normal CN bearer, e.g. over N3 to the UPF from the gNB, that is, a bearer that may correspond to the first CN bearer 141a. When the gNB decodes information from a group transmission and identifies the source UE, the gNB may add said first identifier to the data packets when it transmits the data over the source UE's normal N3 bearer to the UPF node, e.g. over the first CN bearer 141a. This way the normal CN bearer, which is device specific, can at least temporarily become a device specific group bearer, i.e. said certain identifier enables it to be recognized as such. The core network node(s) involved in charging, e.g. SMF/PCRF node(s) may thus identify that this N3 bearer is used as a group bearer for a specific user and apply a separate charging policy accordingly. In this situation there may thus only be a single CN bearer per UE over each interface, e.g. a single CN bearer per interface, e.g. 141a and 142a but not 141b and 142b in FIG. 2, but where said first identifier has "tagged" the device specific CN bearers 141a, 142a so they can be recognised as being used as device specific group bearers.

Another situation that may need separate handling has also been identified and corresponds to the second problem mentioned above. This is situation occurs when a UE has no own core network bearer, i.e. no device specific bearer, but there is a common group bearer, e.g. over N3 and N6. Say e.g. that 141b and 142b are common group bearers and there is no device specific bearers 141a and 142a. Thus, the solutions above are difficult to apply. Instead the solution may be to use a special or certain second identifier, preferably one that identified the UE, and that is attached by gNB when the data is sent on the common group bearer, e.g. to the UPF. The common group bearer may thereby be identified as relating to the UE identified by the identifier and also be recognised as a group bearer for a specific user, i.e. the UE in question, or in other words be recognised as a device specific group bearer. In this situation there may thus also only be a single CN bearer per UE over each interface, e.g. a single CN bearer per interface, e.g. 141*b* and 142*b* but not 141*a* and 142*a* in FIG. 2. That is, the second identifier may be considered to "tag" CN group bearers 141*b*, 142*b* so they are recognized as relating to a specific UE, or in other words can be recognized as being used as device specific group bearers. Also here the core network node(s) involved in charging, e.g. SMF/PCRF node(s) may thereby identify that this N3 bearer is used as a group bearer for a specific user and apply a separate charging policy accordingly.

Solution to the third problem mentioned above is to utilize the foregoing and apply separate charging for source and assisting wireless devices, i.e. in addition to that charging for group transmission can be separated from charging in a conventional situation. Such separate charging of source and assisting wireless devices can be based on charging the source wireless device similar to conventional charging, but compensate or reward the assisting wireless devices.

Note that in the following and for some examples, it may be assumed that a group has already been established, e.g. registered, for example using Prose functionality and that all wireless devices of the group, e.g. wireless devices 120*a-c* of group 125, has got a group identifier identifying the group, e.g. a group C-RNTI. Further, it may also be assumed that one wireless device of he group has been assigned or act as coordinator of the group. The coordinator may be the wireless device that registers the group and broadcasts the group C-RNTI to the other members.

Figure 3:
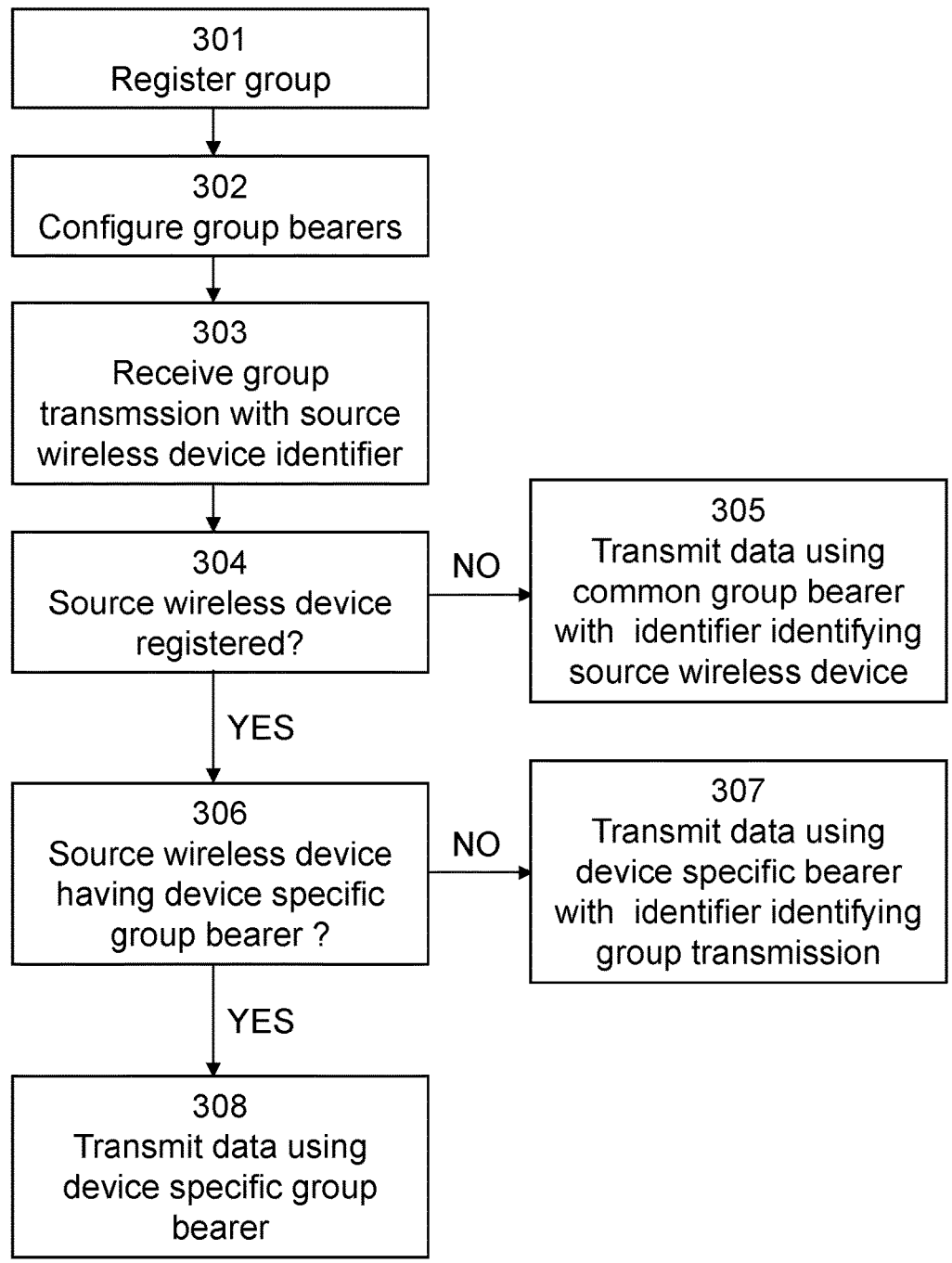
FIG. 3 is a flowchart schematically illustrating actions from perspective of a radio network node and that relates to some embodiments.

FIG. 3 is a flowchart schematically illustrating actions from perspective of a radio network node, e.g. 110, such as a gNB, and relating to the above solutions and some embodiments herein.

The actions below may be taken in any suitable order and/or be carried out fully or partly overlapping in time when this is possible and suitable.

Action 301

Group registration is performed, at least partly involving, e.g. performed by, the gNB. Group registration for group transmission typically involve at least the nodes that subsequently need to be aware of that there is a group transmission and be able to act accordingly, and e.g. differently from normal transmission. The group registration may involve several sub actions. For example, the group registration may involve registration so that the involved wireless communication network 100, i.e. relevant parts thereof, e.g. the radio network node 110 and/or the core network node(s) 130, gets informed which wireless devices are part of the group, e.g. 125, and for example their role and/or function. Of course also the wireless devices part of the group need to get informed about the role they will have or may have in case of group transmission etc. The present action may e.g. determine and/or inform about which, or at least some, wireless device(s) part of the group, such as which wireless device is coordinating wireless device, assisting wireless device(s) and/or source wireless device.

The registration may e.g. be triggered by the network and/or the source wireless device 120*a*, e.g. based on that group transmission is possible and/or may be favorable over normal transmission. The group registration may be triggered in response to a real or potential need to perform group transmission, e.g. in advance when a situation occurs, or is identified to be about to occur, where group transmission is needed or beneficial.

The group registration may basically be performed in many different ways, e.g. according to any conventional way of performing group registration for any conventional way of performing group transmission, and is as such not central for embodiments herein. A detailed example of group registration in a 3GPP 5G context and based on Prose functionality, will be discussed separately below in relation to FIG. 4.

Action 302

Group bearers are configured for the group transmission, e.g. based on the solutions discussed above. This may be considered part of group registration but is here discussed as a separate action. Configuring the group bearers may at least partly involve, e.g. be performed by, the radio network node 110, such as a gNB, at least regarding bearers over an interface interfacing the radio network node 110, e.g. N3.

This action may thus result in that e.g. group CN bearers, general and/or device specific, as discussed above and shown in FIG. 2, are configured, prepared and/or set up, e.g. group bearers over N1 and N6 interfaces, i.e. CN bearers with a group context.

Thus device specific group CN bearers 141*a* and/or 141*b* may be configured in this action.

Action 303

As part of group transmission, the radio network node 110, e.g. gNB, receives group transmission with an identifier identifying the source wireless device, e.g. identifying the wireless device 120*a*.

The group transmission, in addition to the source wireless device 120*a*, also involves assisting wireless devices, e.g. 120*b* and possibly 120*c* also acting as assisting wireless device. These may thus assist the source wireless device 120*a* via SL(s) in transmission of data to/from the wireless communication network 100, more specifically to, or via, at least the radio network node 110. That is, data is transmitted for, or on behalf of, the source wireless device 120*a*. The group transmission as such may be performed in many different ways, e.g. according to any conventional way of performing group transmission. This action, typically also the associated previous action, may thus not only correspond to such "two-hops" group transmission concept as indicated above, but may alternatively correspond to also other types of group transmission or relay transmission related scenarios.

In any case, it is assumed for the bellow action tat that the radio network node 110 at least receives data that it identified as part of group transmission and with an identifier identifying the source wireless device of the group transmission.

Action 304

The radio network node 110 may check if the wireless device 120*a*, i.e. the source wireless device in this example, as identified in Action 303, is registered with the network. It may e.g. not be registered if it has not recently been connected to the wireless communication network 100. However, through group transmission it can still be able to communicate data to/from the network. If it is registered there may be a device specific bearer for it in the CN but if not registered there is no device specific bearer for it in the CN.

Action 305

In case the wireless device 120*a* is not registered, there is a situation as described above and corresponding to the second problem to be solved. As already mentioned the solution may be to route data over a common group bearer in the CN for the group transmission, e.g. configured or set up under Action 301 and/or Action 302 above, and to this group bearer add an identifier identifying the wireless device 120*a*, i.e. the source wireless device. The common group bearer, e.g. group CN bearer 141*b*, may thereby be identified as relating to the source wireless device and be recognised and used as a device specific group bearer.

The data of the group transmission can via this bearer, e.g. 141*b*, be routed to CN node, e.g. the CN node 130*a*, such as an UPF node, that thereby is enabled to recognize that this is a group transmission and that the data being transmitted is with the wireless device 120*a* as source wireless device, and thus becomes able to charge the wireless device accordingly.

Without this, an operator would typically not be able to charge the source wireless device in this situation since there is no device specific CN bearer and no charging policy associated with such bearer.

Action 306

In case the wireless device 120*a* is not registered, there is instead a situation as described above and corresponding to the first problem to be solved. It is checked under the present action if it for the wireless device 120*a* is configured a device specific group bearer, e.g. under Action 301 and/or Action 302, which then typically is a bearer in parallel to a device specific bearer used for conventional transmission. That is, it may be checked if the wireless device 120*a* in addition to having a configured device specific CN bearer 141*a* also has a configured device specific group bearer 141*b* for group transmissions, which also may be referred to as dedicated CN group bearer, or if it does not have such bearer.

Action 307

In case it for the wireless device 120*a* is not configured such device specific group bearer, e.g. 141*b*, there is a situation as described above and alternative solution to the first problem. In other words, there is typically "only" a device specific CN bearer 141*a* and the solution is to add an identifier identifying that the bearer at least temporarily will be used and can be recognized as a device specific group bearer, i.e. an identifier corresponding to the second identifier mentioned above. The data of the group transmission can then via bearer 141*a*, e.g. conventional device specific CN bearer modified with said second identifier, be routed to a CN node, e.g. the CN node 130*a*, such as an UPF node. The CN node, e.g. UPF node, is thereby enabled to recognize that this is a group transmission and that the data being transmitted is with the wireless device 120*a* as source wireless device, and thus becomes able to charge the wireless device 120*a* accordingly.

There should also be a separate charging policy for the wireless device in the CN node(s) involved in charging, such as SMF and/or PCF node(s), e.g. CN node 130*c*, when group transmission is used. The creation of such separate charging policy may be done in Action 301.

Action 308

In case it for the wireless device 120*a* is configured a device specific group bearer, e.g. 141*b*, there is a situation as described above and for solving said first problem, i.e. a situation with typically two parallel CN bearers 141*a, b*, one device specific CN bearer 141*a* for conventional transmission and one device specific group CN bearer 141*b* for group transmission. The data of the group transmission can then via the device specific group CN bearer 141*b* be routed to a CN node, e.g. the CN node 130*a*, such as an UPF node. The CN node, e.g. UPF node, is thereby enabled to recognize that this is a group transmission and that the data being transmitted is with the wireless device 120*a* as source wireless device, and thus becomes able to charge the wireless device 120*a* accordingly.

Once a suitable CN node, e.g. 130*a* or UPF node, has information via the device specific group CN bearer, e.g. data amount, identification of group transmission and source wireless device, such as resulting from any one of Actions 305, 397, 308, it may communicate relevant information to one or more CN nodes more directly involved in the charging, such as to a CN node 130*c*, e.g. SMF node. In 5G core network the charging is e.g. taken care of by SMF and/or PCF node(s). Other users, e.g. of assisting wireless devices, may be made more willing to participate in a group transmission, even though they have little or no own data for transmission, by utilizing a pay-back charging parameter(s) in the charging CN node(s), e.g. SMF/PCF node(s) That is, any wireless device of the group, e.g. wireless devices 120*b,c* of the group 125 acting as assisting wireless device, and that does not transmit its own data, can through such pay-back charging parameters have a pay-back in terms of cost, volume, bit-rate etc. The source wireless device e.g. benefit from the group transmission through shorter total transmission time and/or improved coverage. Therefore, the source wireless device may be charged at a higher rate for its group transmission assisted by other wireless devices than it would be for conventional transmission.

Hence, in 5G, the SMF/PCF node(s) can apply the charging policy since embodiments as exemplified above carry information that enables the SMF/PCF nodes(s) to identify data volumes, e.g. amount of data, transmitted as group transmission, and also the source wireless device. Information of data volume relating to individual assisting wireless devices may e.g. be based on knowledge of which wireless devices belong to the group. Payback to the assisting wireless devices may be distributed equally to all wireless devices of the group except the source wireless device.

Figure 4:
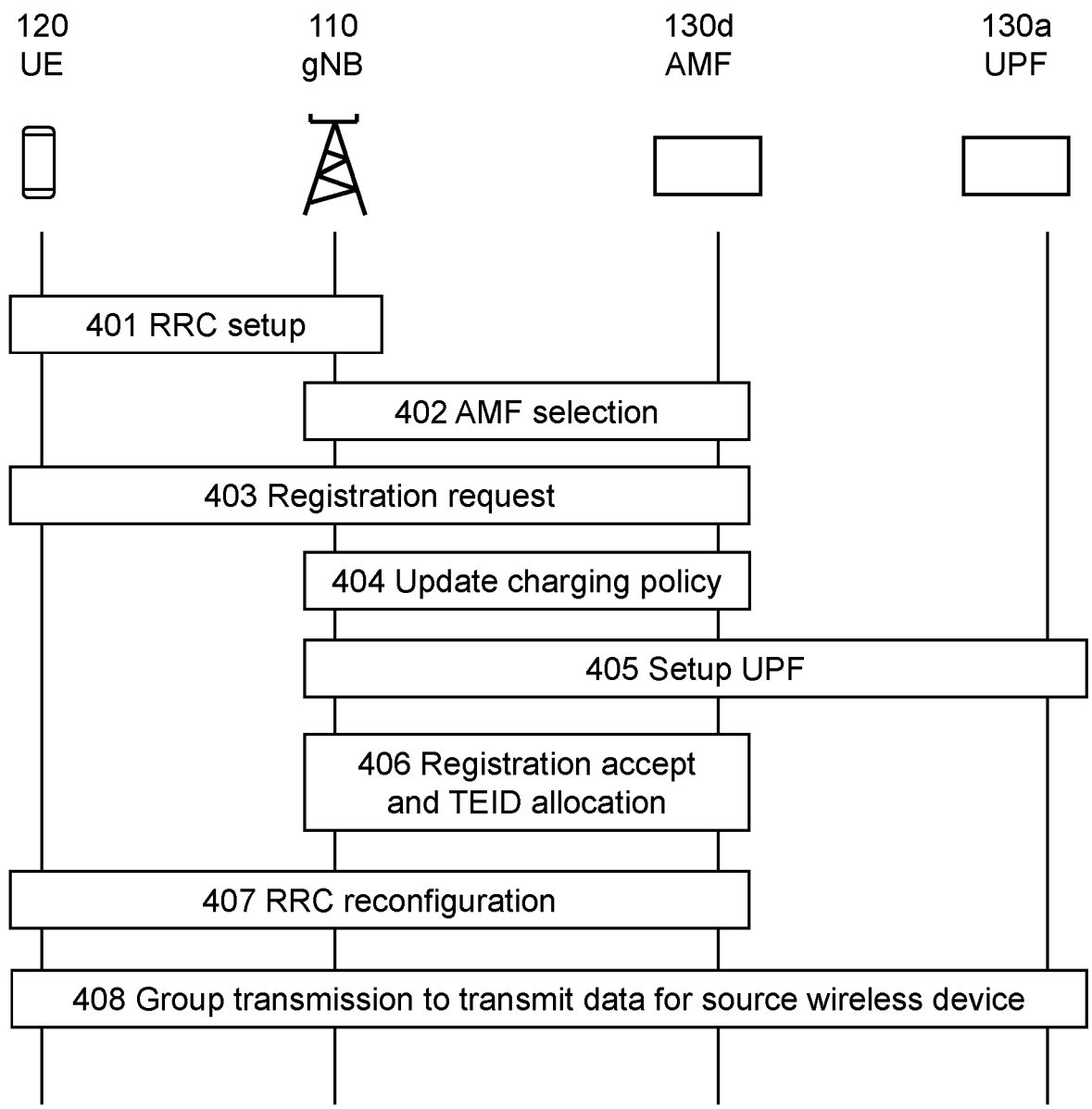
FIG. 4 depicts a combined signaling diagram and flowchart for exemplifying group registration that may be used with some embodiments.

FIG. 4 depicts a combined signaling diagram and flowchart, which will be used to exemplify group registration in a 3GPP 5G context and that may be used with embodiments herein, i.e. group registration details that may relate to Action 301 and for supporting the situation and charging discussed above in relation not FIG. 3.

In the following it is assumed that if a UE is in a so called CONNECTED state, there will be at least one default bearer set-up together with UE context. It is further, as indicated above, assumed that a coordinating wireless device of the group, or simply coordinator, is present and involved in registering the group.

Involved nodes is a UE, e.g. coordinator, exemplifying one of the wireless devices 120*a-c*, e.g. 120*c* and that thus may correspond to a coordinator of the group 125, a gNB exemplifying the radio network node 110, a AMF node exemplifying a core network node 130*d* part of the core network nodes 130 and a UPF node that may be the UPF node and core network node 130*a* discussed above and exemplifying a core network node 130*a* of the core network nodes 130.

The actions below may be taken in any suitable order and/or be carried out fully or partly overlapping in time when this is possible and suitable.

Action 401

Radio Resource Control (RRC) setup. The setup may basically be a conventional one but with indication that it is a group setup, e.g. a RRC setup particularly for group transmission. For example, the coordinator, i.e. UE, may when it wants to register the group, include in the RRC setup a certain indication, e.g. "group setup", and group members identities, i.e. ID of the wireless devices of the group.

Action 402

AMF selection. An AMF is selected, typically initiated by the gNB. An AMF node of the CN is typically involved in or may even be considered responsible for the registration.

Action 403

Registration request. When a RRCSetupComplete is sent, the coordinator, i.e. the UE, may send the registration request. This may include the UE identity as well as a list of wanted PDU sessions corresponding to bearers. The coordinator may include the group indication, e.g. an identifier identifying it is for group transmission, i.e. a group registration. This may be a group identifier or group ID and also a list of the UE IDs in the group, which implicitly may command the AMF to also create PDU sessions, i.e. bearers, for the group and specific UE bearer for each UE in the group, i.e. for accomplishing such device specific group bearers, and thereby "parallel" set of bearers per UE as discussed above Acton 404

Update charging policy. The AMF setups the charging associated with the group registered UEs to the PCF. Here it should be added "group specific charging", i.e. in addition to conventional charging. This can be a simple indication to the PCF that a group ID is actually a group and should be treated as such. Also, the UE IDs of the group, such as the group bearers and Tunnel End Point Identifiers (TEIDs) associated with them may also indicates that UE IDs of the group shall be treated in a specific way and not as conventionally regarding charging. Note that the PCF actually may be considered to "subscribe" to changes, so the AMF can also notify this at a later stage also, such as when/if PDU sessions are setup later.

Acton 405

Setup UPF. The AMF, e.g. in cooperation with SMF, setups the UPF and informs the UPF of the new PDU sessions.

Action 406

Registration accept and TEID allocation. The AMF informs the gNB which uplink TEID to use for each PDU session. This may include TEID for a general group bearer and device specific group bearers. The AMF may initiate this as a session setup with the gNB and a message typically containing a Registration Accept NAS message. The message carrying one or more PDU session setup requests. Each PDU session may be addressed a "PDU session ID" and may also carry the uplink TEID, e.g. for conventional use, group uplink TEID and UE specific group UL TEID that may be used for device specific group bearer. The gNB should respond to the AMF with corresponding DL TEIDs to be used by the UPF to send DL data to the gNB.

Action 407

RRC reconfiguration. The gNB reconfigures the UE with i.a. PDU session status.

Actions 401-407 may be considered examples of at least part of Actions 301-302 discussed in the foregoing, and indicates in some further detail how the group may be registered and bearers be configured in a 3GPP 5G context. Note that several steps and actions that in practice also take part have been omitted for clarity, for example UE authentication and security checks.

Action 408

Group transmission may then take part to transmit data for a source wireless device, e.g. 120a. After the above actions 401-407, conventional device specific CN bearers, e.g. over interface N3, such as first CN bearer 141a for the source wireless device and configured and parallel device specific group CN bearer, e.g. 141b, for the source wireless device can have different charging policies, since the SMF/PCF now can identify that source wireless device data was transmitted as a group transmission.

Note that in reality there are typically more bearers, i.e. PDU sessions for each UE, e.g. due to different type of services being used.

The charging parameters for a group CN bearer can be the same as for a normal CN bearer, e.g. the data volume, bit-rate, QoS etc. but that may be set with other values to make the actual charging for group transmission differ from conventional transmission of the same data amount However, as realized, in addition there can also be parameters related to the group, such as the number of other UEs in the group, that can be used for group transmission and charging thereof.

Figure 5:
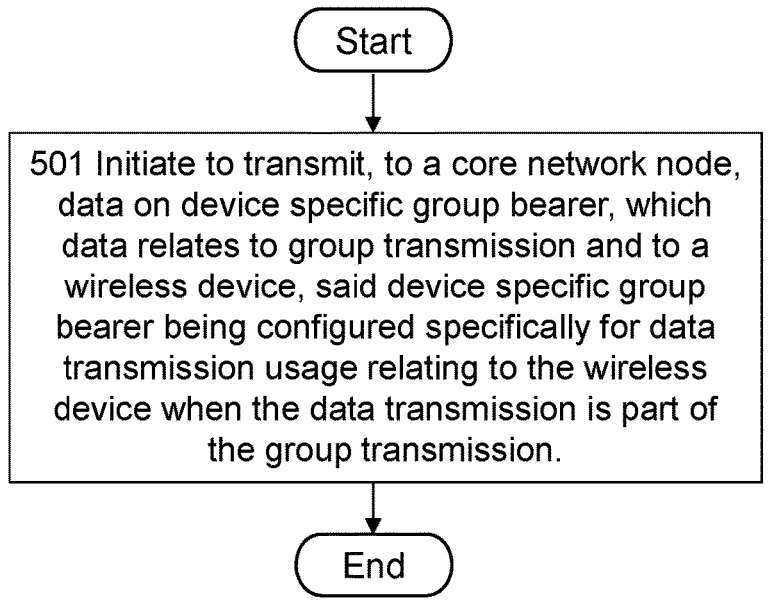
FIG. 5 is a flowchart schematically illustrating actions related to embodiments of a first method.

FIG. 5 is a flowchart schematically illustrating embodiments of a first method according to embodiments herein. The first method is for supporting charging relating to a group transmission in a wireless communication network, e.g. 100, said group transmission involving a group, e.g. 125, of wireless devices, e.g. 120a-c, configured to, via one or more direct communication links between each other, e.g. SLs 122ab, 122ac, 122bc, participate in transmission of first data between a source wireless device, e.g. 120a. and the wireless communication network. There may be an assisting wireless device in the group 125, e.g. 120b and a coordinating wireless device, e.g. 120c, i.e. similar as above.

The first method may be performed by one or more first devices, e.g. the radio network node 110, one or some of the core network nodes 130, e.g. 130a such as a UPF node, the further node 201 and/or the further network 200.

Action 501

The first device(s) initiates to transmit, to a network node of the wireless communication network 100, second data on a device specific group bearer, e.g. any one of 141a, 141b as will be explained below, in a core network, e.g. 102, of the wireless communication network 100. The second data relates to the group transmission and to a wireless device, e.g. any one of 120a-c, of the group 125. Said device specific group bearer, e.g. 141a or 141b, is configured specifically for data transmission usage relating to the wireless device when the data transmission is part of the group transmission. The device specific group bearer should thus be for use in the core network 102 and may then be named device specific group CN bearer. As used herein, by core network bearer is thus meant a bearer for transmission in a core network, i.e. here a core network of the wireless communication network 100, e.g. CN 102. As used herein, a data transmission being part of a group transmission means that the data transmission at least relate to the group transmission but typically that the data being transmitted is at least part of the data that is being transmitted by the group to and/or from the source wireless device.

In some embodiments, the second data is the same as the first data. This is e.g. the case when the device specific group bearer relates to the source wireless device, and may then relate to data transmitted on behalf of the source wireless device as part of the group transmission.

In other words, in some embodiments, the wireless device is the source wireless device 120a and said second data corresponds to said first data.

In some embodiments, the wireless device is a wireless device of the group 125 configured to assist with the group transmission, i.e. an assisting wireless device, e.g. 120b.

In some embodiments, the second data is transmitted by a radio network node, e.g. 110, and the network node transmitted to may then e.g. be the core network node 130a in the above example, e.g. corresponding to a UPF node or node(s) with such functionality.

In some embodiments, the second data is transmitted by a core network node of the core network node(s) 130, e.g. the core network node 130a, such as corresponding to a UPF node or node(s) with such functionality. The network node transmitted to may then e.g. be the radio network node 110 or core network node 130b in the above example, e.g. corresponding to a DN node or node(s) with such functionality.

In some embodiments, said device specific group bearer, e.g. 141b, is additional to another device specific bearer, e.g. 141a, relating to the wireless device and that is for data transmission usage relating to the wireless device when the data transmission is separate from the group transmission.

This may thus correspond to a situation as in Action 308 above, i.e. with "parallel" set of device specific CN bearers for a wireless device, one for conventional transmission and one for group transmission relating to the wireless device.

In some embodiments, said device specific group bearer, e.g. 141a, is a device specific bearer for data transmission usage relating to the wireless device when the data transmission is separate from the group transmission, e.g. other, such as conventional, transmission. However, said device specific bearer 141a is configured with an identifier that identifies the device specific bearer 141a as currently being used for data transmission that is part of the group transmission and relating to the wireless device, whereby the device specific bearer 141a is transformed to said device specific group bearer.

This may thus correspond to a situation as in Action 307 above.

In some embodiments, said device specific group bearer (141b) is a group bearer, e.g. 141b, for data transmission usage relating to the group 125 in general when the data transmission relates to the group transmission. However, said group bearer 141b is configured with an identifier that identifies the wireless device, whereby the group bearer 141b is transformed to said device specific group bearer.

This may thus correspond to a situation as in Action 305 above.

As may be recognized, the present action may fully or partly correspond to one or more of Actions 305, 307, 308, 408, discussed above.

As used herein, device(s) that initiates to perform an action, e.g. to transmit, refers to any pre-action and/or sub-action that causes or makes the action to be performed. The initiation, i.e. pre-action and/or sub-action, may be performed by the device that performs the action itself or another entity. A device that change from not performing an action to actively performing an action itself will include some initiation to perform the action, or in other words, initiate to perform an action is included when a device itself performs the action. Initiation of an action performed by another entity than performing the action itself may correspond to some signal provided or action performed by the other entity, e.g. trigger signal, that causes the device to perform the action. As mentioned, in some embodiments the present action is e.g. performed by the radio network node 110 and in some embodiments by a core network node 130, e.g. 130a, such as a UPF node. In these embodiments, the respective node typically also transmits the second data, and initiate to transmit may above simply be replaced by transmit.

Figure 6:
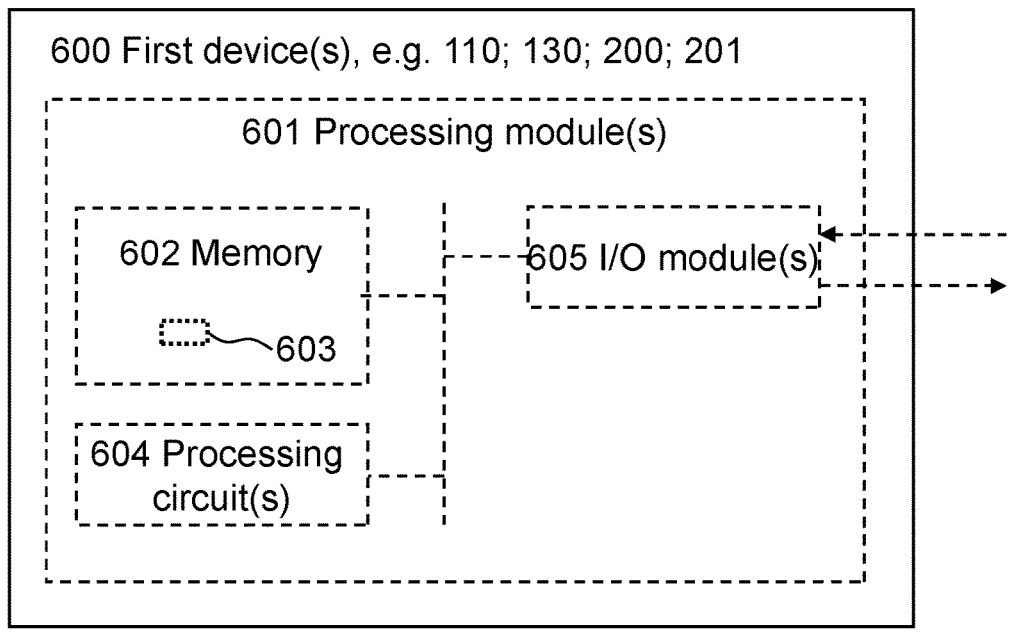
FIG. 6 is a functional block diagram for illustrating embodiments of a first device(s) and how it can be configured to carry out the first method.

FIG. 6 is a schematic block diagram for illustrating embodiments of one or more first devices 600. The schematic block diagram is also used for illustrating embodiments of how the first device(s) 600 may be configured to perform the first method and actions thereof as discussed above in relation to FIG. 5.

Hence, the first device(s) 600 is for supporting charging relating to a group transmission in a wireless communication network, e.g. 100, said group transmission involving a group, e.g. 125, of wireless devices, e.g. 120a-c, configured to, via one or more direct communication links between each other, e.g. SLs 122ab, 122ac, 122bc, participate in transmission of first data between a source wireless device, e.g. 120a. and the wireless communication network, i.e. similar as above.

The first device(s) may comprise or be the radio network node 110, one or some of the core network nodes 130, e.g. 130a such as a UPF node, the further node 201 and/or the further network 200.

The first device(s) 600 may comprise processing module(s) 601, such as a means, one or more hardware modules, including e.g. one or more processors, and/or one or more software modules for performing said method and/or actions.

The first device(s) 600 may further comprise memory 602 that may comprise, such as contain or store, a computer program 603. The computer program 603 comprises 'instructions' or 'code' directly or indirectly executable by the first device(s) 600 to perform said method and/or actions. The memory 602 may comprise one or more memory units and may further be arranged to store data, such as configurations and/or applications involved in or for performing functions and actions of embodiments herein.

Moreover, the first device(s) 600 may comprise processing circuit(s) 604 as exemplifying hardware module(s) and may comprise or correspond to one or more processors. In some embodiments, the processing module(s) 601 may comprise, e.g. 'be embodied in the form of or 'realized by' the processing circuit(s) 604. In these embodiments, the memory 602 may comprise the computer program 603 executable by the processing circuit(s) 604, whereby the first device(s) 600 is operative, or configured, to perform said method and/or actions thereof.

Typically the first device(s) 600, e.g. the processing module(s) 601, comprises Input/Output (I/O) module(s) 605, configured to be involved in, e.g. by performing, any communication to and/or from other units and/or nodes, such as sending and/or receiving information to and/or from other nodes or devices. The I/O module(s) 605 may be exemplified by obtaining, e.g. receiving, module(s) and/or providing, e.g. sending, module(s), when applicable.

Further, in some embodiments, the first device(s) 600, e.g. the processing module(s) 601, comprises one or more of initiating module(s) and transmitting module(s), as exemplifying hardware and/or software module(s). These modules may be fully or partly implemented by the processing circuit(s) 604.

Hence:

The first device(s) 600, and/or the processing module(s) 601, and/or the processing circuit(s) 604, and/or the I/O module(s) 605, the initiating module(s) and/or the transmitting module(s) may be operative, or configured, to initiate to transmit, to said network node of the wireless communication network 100, said second data on said device specific group bearer in said core network of the wireless communication network 100.

Figure 7:
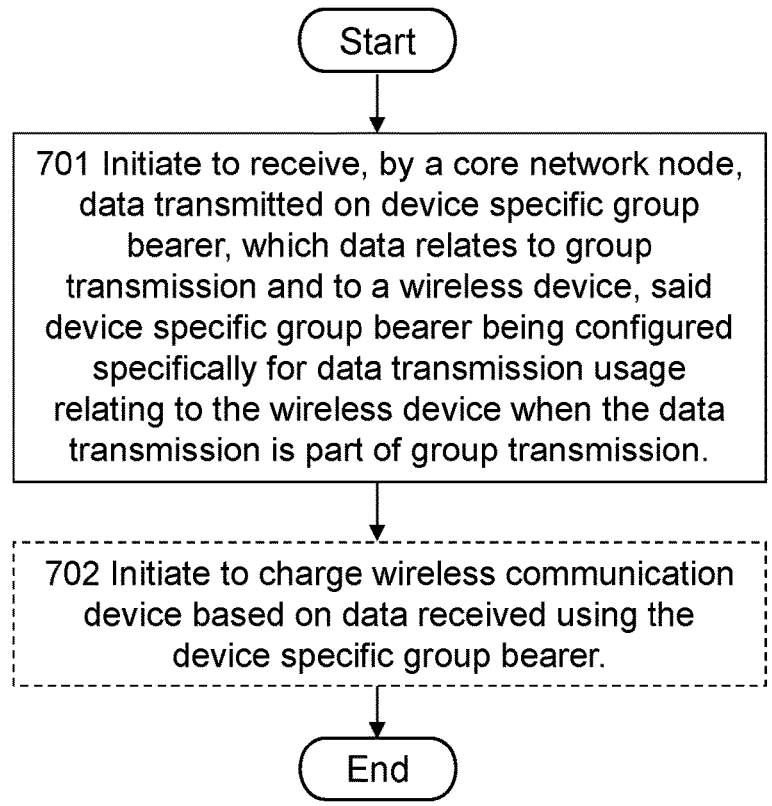
FIG. 7 is a flowchart schematically illustrating actions related to embodiments of a second method.

FIG. 7 is a flowchart schematically illustrating embodiments of a second method according to embodiments herein. The second method is for supporting charging relating to a group transmission in a wireless communication network, e.g. 100, said group transmission involving a group, e.g. 125, of wireless devices, e.g. 120a-c, configured to, via one or more direct communication links between each other, e.g. SLs 122ab, 122ac, 122bc, participate in transmission of first data between a source wireless device, e.g. 120a. and the wireless communication network. There may be an assisting wireless device in the group 125, e.g. 120b and a coordinating wireless device, e.g. 120c, i.e. similar as above.

The second method may be performed by one or more second devices, e.g. one or some of the core network nodes 130, e.g. 130a such as a UPF node, one or more core network nodes involved in charging, the radio network node 110, the further node 201 and/or the further network 200.

Action 701

The second device(s) initiates to receive, by a network node of the wireless communication network 100, second data transmitted on a device specific group bearer, e.g. any one of 141a, 141b as will be explained below, in a core network, e.g. 102, of the wireless communication network 100. The second data relates to the group transmission and to a wireless device, e.g. any one of 120a-c, of the group 125. Said device specific group bearer, e.g. 141a or 141b, is configured specifically for data transmission usage relating to the wireless device when the data transmission is part of the group transmission.

In some embodiments, the second data is the same as the first data. This is e.g. the case when the device specific group bearer relates to the source wireless device, and the data may then relate to data transmitted on behalf of the source wireless device as part of the group transmission.

In other words, in some embodiments, the wireless device is the source wireless device 120a and said second data corresponds to said first data.

In some embodiments, the wireless device is a wireless device of the group 125 configured to assist with the group transmission, i.e. an assisting wireless device, e.g. 120b.

In some embodiments, the second data is transmitted by a radio network node, e.g. 110, and the network node that receives in the present action may then e.g. be the core network node 130a in the above example, e.g. corresponding to a UPF node or node(s) with such functionality.

In some embodiments, the second data is transmitted by a core network node of the core network node(s) 130, e.g. the core network node 130a, such as corresponding to a UPF node or node(s) with such functionality. The network node that receives in the present action may then e.g. be the radio network node 110 or core network node 130b in the above example, e.g. corresponding to a DN node or node(s) with such functionality.

In some embodiments, said device specific group bearer, e.g. 141b, is additional to another device specific bearer, e.g. 141a, relating to the wireless device and that is for data transmission usage relating to the wireless device when the data transmission is separate from the group transmission.

This may thus correspond to a situation as in Action 308 above, i.e. with "parallel" set of device specific CN bearers for a wireless device, one for conventional transmission and one for group transmission relating to the wireless device.

In some embodiments, said device specific group bearer, e.g. 141a, is a device specific bearer for data transmission usage relating to the wireless device when the data transmission is separate from the group transmission, e.g. other, such as conventional, transmission. However, said device specific bearer 141a is configured with an identifier that identifies the device specific bearer 141a as currently being used for data transmission that is part of the group transmission and relating to the wireless device, whereby the device specific bearer 141a is transformed to said device specific group bearer.

This may thus correspond to a situation as in Action 307 above.

In some embodiments, said device specific group bearer (141b) is a group bearer, e.g. 141b, for data transmission usage relating to the group 125 in general when the data transmission relates to the group transmission. However, said group bearer 141b is configured with an identifier that identifies the wireless device, whereby the group bearer 141b is transformed to said device specific group bearer.

This may thus correspond to a situation as in Action 305 above.

As mentioned, in some embodiments the present action is e.g. performed by a core network node 130, e.g. 130a, such as a UPF node. In these embodiments, the node typically also receives the second data, and initiate to receive may above simply be replaced by receive.

As may be recognized, the present action may fully or partly correspond to one or more of Actions 305, 307, 308, 408, discussed above.

Action 702

It may be initiated to charge the wireless communication device based on the second data received using the device specific group bearer. This was exemplified in some detail above. For example, the charging may further based on an amount of said second data received using the device specific group bearer.

In some embodiments, the charging is further based on rewarding one or more of wireless communication devices of the group that have assisted in the group transmission, e.g. 120b. The rewarding may be based on the number of wireless device configured to assist with the group transmission. This may enable a simple way to reward since it may suffice to keep track of the data amount transmitted on behalf of the source wireless device as part of the group transmission to find out a total reward and then distribute it, e.g. split it, between the assisting wireless devices, without having to keep track of exactly how much each have contributed with.

Moreover, the charging may be based on predetermined charging parameters, at least some of which are specific for group transmission.

Figure 8:
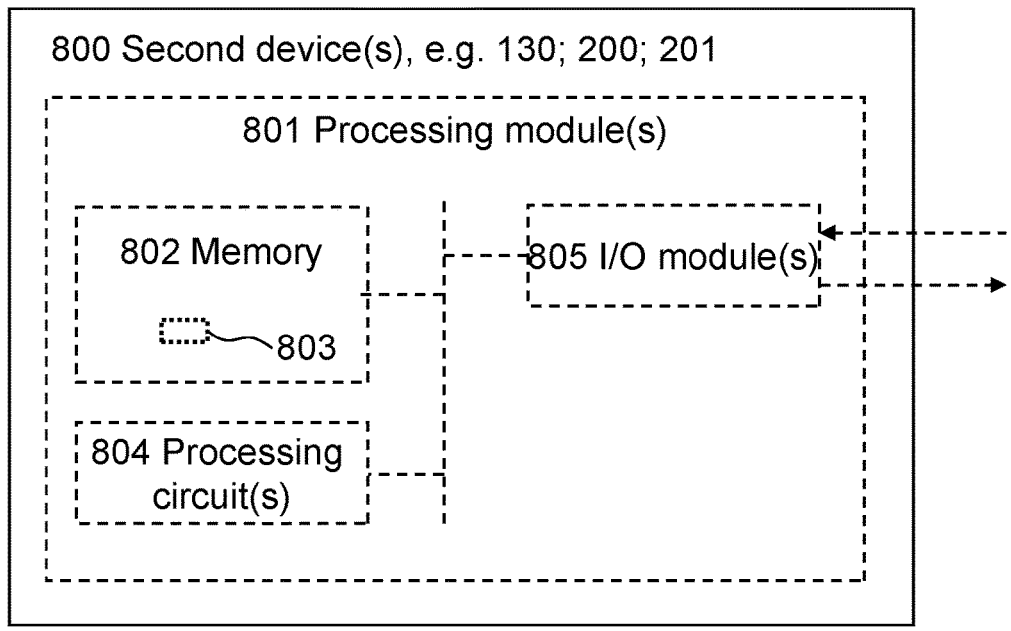
FIG. 8 is a functional block diagram for illustrating embodiments of a second device(s) and it can be configured to carry out the second method.

FIG. 8 is a schematic block diagram for illustrating embodiments of one or more second devices 800. The schematic block diagram is also used for illustrating embodiments of how the second device(s) 800 may be configured to perform the second method and actions thereof as discussed above in relation to FIG. 7.

Hence, the second device(s) 800 is for supporting charging relating to a group transmission in a wireless communication network, e.g. 100, said group transmission involving a group, e.g. 125, of wireless devices, e.g. 120a-c, configured to, via one or more direct communication links between each other, e.g. SLs 122ab, 122ac, 122bc, participate in transmission of first data between a source wireless device, e.g. 120a. and the wireless communication network, i.e. similar as above.

The second device(s) may e.g. comprise or be one or some of the core network nodes 130, e.g. 130a such as a UPF node, one or more core network nodes involved in charging, the radio network node 110, the further node 201 and/or the further network 200.

The second device(s) 800 may comprise processing module(s) 801, such as a means, one or more hardware modules, including e.g. one or more processors, and/or one or more software modules for performing said method and/or actions.

The second device(s) 800 may further comprise memory 802 that may comprise, such as contain or store, a computer program 803. The computer program 803 comprises 'instructions' or 'code' directly or indirectly executable by the second device(s) 800 to perform said method and/or actions. The memory 802 may comprise one or more memory units and may further be arranged to store data, such as configurations and/or applications involved in or for performing functions and actions of embodiments herein.

Moreover, the second device(s) 800 may comprise processing circuit(s) 804 as exemplifying hardware module(s) and may comprise or correspond to one or more processors. In some embodiments, the processing module(s) 801 may comprise, e.g. 'be embodied in the form of or 'realized by' the processing circuit(s) 804. In these embodiments, the memory 802 may comprise the computer program 803 executable by the processing circuit(s) 804, whereby the first device(s) 800 is operative, or configured, to perform said method and/or actions thereof.

Typically the first device(s) 800, e.g. the processing module(s) 801, comprises Input/Output (I/O) module(s) 805, configured to be involved in, e.g. by performing, any communication to and/or from other units and/or nodes, such as sending and/or receiving information to and/or from other nodes or devices. The I/O module(s) 805 may be exemplified by obtaining, e.g. receiving, module(s) and/or providing, e.g. sending, module(s), when applicable.

Further, in some embodiments, the second device(s) 800, e.g. the processing module(s) 801, comprises one or more of initiating module(s), receiving module(s) and charging module(s), as exemplifying hardware and/or software module(s). These modules may be fully or partly implemented by the processing circuit(s) 804.

Hence:

The second device(s) 800, and/or the processing module(s) 801, and/or the processing circuit(s) 804, and/or the I/O module(s) 805, the initiating module(s) and/or the receiving module(s) may be operative, or configured, to initiate to receive, by said network node of the wireless communication network 100, said second data transmitted on said device specific group bearer, e.g. any one of 141a, 141b, in said core network, e.g. 102, of the wireless communication network 100.

The second device(s) 800, and/or the processing module(s) 801, and/or the processing circuit(s) 804, and/or the I/O module(s) 805, the initiating module(s) and/or the charging module(s) may be operative, or configured, to initiate to charge the wireless communication device based on the second data received using the device specific group bearer.

Figure 9:
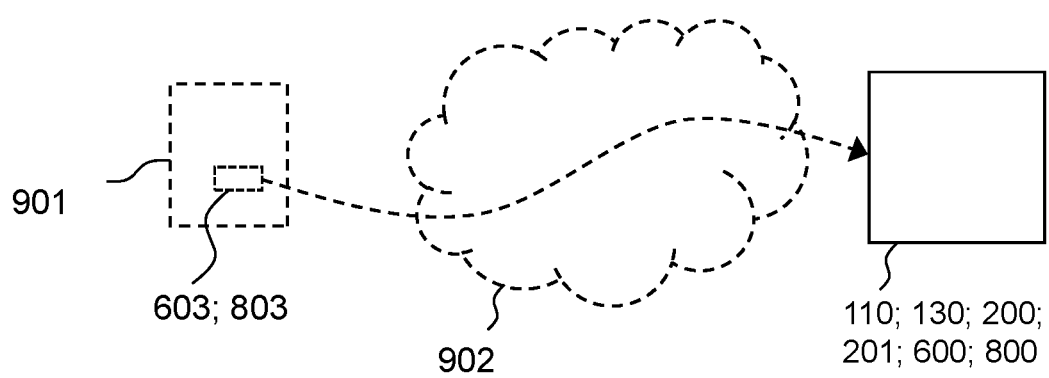
FIG. 9 is a schematic drawing illustrating some embodiments relating to computer programs and carriers thereof.

FIG. 9 is a schematic drawing illustrating some embodiments relating to computer program(s) and carrier(s) thereof to cause said first device(s) 600 and/or second device(s) 800 discussed above to perform the associated methods and actions, respectively. The computer program(s) may be the computer program 603 and/or 803 and comprises instructions that when executed by the processing circuit(s) 604 and/or 804 and/or the processing module(s) 601 and/or 801, causes the respective device(s) 600, 800 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 901 as schematically illustrated in the figure. One or more of the computer programs 603, 803 may thus be stored on the computer readable storage medium 901. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 901 may be used for storing data accessible over a computer network 902, e.g. the Internet or a Local Area Network (LAN). One or more of the computer programs 603, 803 may furthermore be provided as pure computer program(s) or comprised in a file or files. The file or files may be stored on the computer readable storage medium 901 and e.g. available through download e.g. over the computer network 902 as indicated in the figure, e.g. via a server. The server may e.g. be a web or File Transfer Protocol (FTP) server. The file or files may e.g. be executable files for direct or indirect download to and execution on said first node to make it perform as described above, e.g. by execution by the processing circuit(s) 604 and/or 804. The file or files may also or alternatively be for intermediate download and compilation involving the same or another processor to make them executable before further download and execution causing said first device(s) 600 and/or second device(s) 800 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node. e.g. in the form of a device, that may communicate with another node in and be comprised in a communication network, e.g. Internet Protocol (IP) network and/or wireless communication network. Further, such node may be or be comprised in a radio network node (e.g. as described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless device", "user equipment" and "UE", as may be used herein, may as such refer to any type of wireless communication device arranged to communicate with a radio network node in a wireless, cellular and/or mobile communication system, and may thus be referred to as a wireless communication device or simply wireless device. Examples include: target devices, device to device UE, device for Machine Type of Communication (MTC), machine type UE or UE capable of machine to machine (M2M) communication, Personal Digital Assistant (PDA), Tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first node, second node, first device, second device, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. A method, performed by one or more first devices, to support charging relating to a group transmission in a wireless communication network, said group transmission involving a group of wireless devices configured to, via one or more direct communication links between each other, participate in transmission of first data between a source wireless device and the wireless communication network, wherein the method comprises:
    initiating to transmit, to a network node of the wireless communication network, second data on a device specific group bearer in a core network of the wireless communication network, which second data relates to the group transmission and to a wireless device of the group, the device specific group bearer being configured specifically for data transmission usage relating to the wireless device when the data transmission is part of the group transmission; and
    the device specific group bearer being a device specific bearer for data transmission usage relating to the wireless device when the data transmission is separate from the group transmission, the device specific bearer being configured with an identifier that identifies the device specific bearer as currently used for data transmission that is part of the group transmission and relating to the wireless device, the device specific bearer being transformed to the device specific group bearer.

2. The method as claimed in claim 1, wherein said device specific group bearer is additional to another device specific bearer relating to the wireless device and that is for data transmission usage relating to the wireless device when the data transmission is separate from the group transmission.

3. The method as claimed in claim 1, wherein said device specific group bearer is a group bearer for data transmission usage relating to the group in general when the data transmission relates to the group transmission, wherein said group bearer is configured with an identifier that identifies the wireless device, whereby the group bearer is transformed to said device specific group bearer.

4. The method as claimed in claim 1, wherein the
    wireless device is the source wireless device and said second data corresponds to said first data.

5. The method as claimed in claim 1, wherein the wireless device is a wireless device of the group configured to assist with the group transmission.

6. A method, performed by one or more second devices, to support charging relating to a group transmission in a wireless communication network, said group transmission involving a group of wireless devices configured to, via one or more direct communication links between each other, participate in transmission of first data between a source wireless device and the wireless communication network, wherein the method comprises:
    initiating to receive, by a network node of the wireless communication network second data transmitted on a device specific group bearer in a core network of the wireless communication network, which second data relates to the group transmission and to a wireless device of the group, the device specific group bearer being configured specifically for data transmission usage relating to the wireless device when the data transmission is part of the group transmission; and the device specific group bearer being a device specific bearer for data transmission usage relating to the wireless device when the data transmission is separate from the group transmission, the device specific bearer being configured with an identifier that identifies the device specific bearer as currently used for data transmission that is part of the group transmission and relating to the wireless device, the device specific bearer being transformed to the device specific group bearer.

7. The method as claimed in claim 6, wherein said device specific group bearer is additional to another device specific bearer relating to the wireless device and that is for data transmission usage relating to the wireless device when the data transmission is separate from the group transmission.

8. The method as claimed in claim 6, wherein said device specific group bearer is a group bearer for data transmission usage relating to the group in general when the data transmission relates to the group transmission, wherein said group bearer is configured with an identifier that identifies the wireless device, whereby the device specific bearer is transformed to said device specific group bearer.

9. The method as claimed in claim 6, wherein the wireless device is the source wireless device and said second data corresponds to said first data.

10. The method as claimed in claim 6, wherein the wireless device is a wireless device of the group that assisted with the group transmission.

11. The method as claimed in claim 6, wherein the method further comprises;
initiating to charge the wireless communication device based on the second data received using the device specific group bearer.

12. The method as claimed in claim 11, wherein the charging is further based on an amount of said second data received using the device specific group bearer.

13. The method as claimed in claim 11, wherein the charging is further based on rewarding one or more of wireless communication devices of the group that have assisted in the group transmission.

14. The method as claimed in claim 13, wherein the rewarding is based on the number of wireless device configured to assist with the group transmission.

15. The method as claimed in claim 11, wherein the charging is based on predetermined charging parameters, at least some of which are specific for group transmission.

16. One or more first devices to support charging relating to a group transmission in a wireless communication network, said group transmission involving a group of wireless devices configured to, via one or more direct communication links between each other, participate in transmission of first data between a source wireless device and the wireless communication network, wherein said one or more first devices are configured to:
initiate to transmit, to a network node of the wireless communication network, second data on a device specific group bearer in a core network of the wireless communication network, which second data relates to the group transmission and to a wireless device of the group, the device specific group bearer being configured specifically for data transmission usage relating to the wireless device when the data transmission is part of the group transmission; and the device specific group bearer being a device specific bearer for data transmission usage relating to the wireless device when the data transmission is separate from the group transmission, the device specific bearer being configured with an identifier that identifies the device specific bearer as currently used for data transmission that is part of the group transmission and relating to the wireless device, the device specific bearer being transformed to the device specific group bearer.

17. The one or more first devices as claimed in claim 16, wherein said device specific group bearer is additional to another device specific bearer relating to the wireless device and that is for data transmission usage relating to the wireless device when the data transmission is separate from the group transmission.

* * * * *